United States Patent [19]

Robinson

[11] Patent Number: 5,060,771

[45] Date of Patent: Oct. 29, 1991

[54] ADJUSTABLE AUTOMATIC SHUT-OFF MECHANISM FOR LEVER OR TRIGGER CONTROLLED AIR TOOL

[75] Inventor: Richard D. Robinson, Bryan

[73] Assignee: The Aro Corporation, Bryan, Ohio

[21] Appl. No.: 523,705

[22] Filed: May 15, 1990

[51] Int. Cl.[5] .................... B25B 23/145; B23Q 5/06

[52] U.S. Cl. .................... 192/0.034; 192/56 R; 192/150; 173/12; 173/169; 81/470

[58] Field of Search .................... 192/0.034, 56 R, 150; 173/12, 168, 169; 81/470

[56] References Cited

U.S. PATENT DOCUMENTS

| | | | |
|---|---|---|---|
| 2,986,052 | 5/1961 | Eckman et al. | 81/470 |
| 3,262,536 | 7/1966 | Frisbie et al. | 192/150 |
| 3,288,258 | 11/1966 | Taylor | 192/150 |
| 3,298,481 | 1/1967 | Schaedler et al. | 192/0.034 |
| 3,515,251 | 6/1970 | Clapp | 192/150 |
| 3,710,873 | 1/1973 | Allen | 173/12 |
| 4,088,197 | 5/1978 | Roll et al. | 173/12 |
| 4,223,745 | 9/1980 | Workman, Jr. | 173/12 |
| 4,576,270 | 3/1986 | Baltz et al. | 192/150 |
| 4,650,007 | 3/1987 | Fujita et al. | 173/12 |
| 4,844,177 | 7/1989 | Robinson et al. | 173/12 |

*Primary Examiner*—Richard Lorence

*Attorney, Agent, or Firm*—Allegretti & Witcoff, Ltd.

[57] ABSTRACT

A rotary vane air motor tool includes an adjustable torque sensing clutch which disengages the tool bit from the air motor and simultaneously closes a normally open valve to the air motor upon reaching a threshold value. A lever or toggle actuated normally closed valve is operable to initiate operation of the tool. The normally closed valve includes an exhaust or bypass passage to permit resetting of the normally open valve.

8 Claims, 3 Drawing Sheets

ADJUSTABLE AUTOMATIC SHUT-OFF MECHANISM FOR LEVER OR TRIGGER CONTROLLED AIR TOOL

BACKGROUND OF THE INVENTION

This invention relates to the art of rotary air motor tools such as screwdrivers, wrenches and in, particular, tools of the described type which incorporate a torque responsive, adjustable, automatic shutoff mechanism.

Various prior art, air powered tools incorporate a torque responsive clutch mechanism which automatically disengages the tool spindle from driving relationship with the motor when the torque increases to a preselected magnitude. Prior art patents which describe such mechanisms include:

| Patent No. | Inventor | Title |
|---|---|---|
| 2,732,746 | Livermont | Torque Limiting Screwdriver |
| 2,984,133 | Livermont | Torque Limiting Screw Driver |
| 3,020,789 | Etzkorn | Predetermined Torque Release Hand Tool |
| 3,034,623 | Amstberg | Hand Clutch Device |
| 3,174,599 | Spyridakis, et al. | Power Tool Torque Release Clutch Operative In One Direction |
| 3,187,865 | Blachowski | Predetermined Torque Release Tool With Non-Ratcheting Feature |
| 3,220,526 | Gattiker, Jr. | One Shot Clutch |

Typically, such torque release mechanisms utilize opposed clutch plates which drivingly interconnect by means of bearing members that fit in pockets in the opposed plates. When a predetermined torque level is reached, a biasing force, which normally maintains the plates in driving contact, is overcome and the bearings will move out of the pockets thereby terminating output driving force on the spindle.

Mechanisms of this nature are utilized not only to disengage the driving output from the air motor, but also to effect a shut off device or shut off valve thereby disconnecting the source of pneumatic power to the air tool. For example, Clapp, U.S. Pat. No. 3,515,251 Torque Release and Shut Off Device For Rotary Tools and Frisbie, et al., U.S. Pat. No. 3,262,536 Torque Releasing Clutch Mechanism disclose apparatus for release or closing of an air supply valve upon reaching a predetermined torque. Yet another torque responsive pneumatic tool with an automatic torque responsive shutoff valve is disclosed by Wallace, U.S. Pat. No. 4,071,092, Pneumatic Screwdriver With Torque Responsive Shutoff. Tibbott, U.S. Pat. No. 3,498,389, Automatic Throttle Torque Responsive Power Tool discloses yet another variation of the same type of construction. Another patent which teaches a torque responsive control mechanism for an air tool is Baltz et al., U.S. Pat. No. 4,576,270, Torque Control And Fluid Mechanism For A Fluid Operated Tool.

Often it is desirable initiate operation of such tools by means of a toggle or trigger type switch or a lever control. This is especially true with respect to right angle tools as contrasted with push to start type tools. Thus, various lever mechanisms and trigger mechanisms have been disclosed which are utilized for the initiation of operation of an air motor driven tool by opening the inlet valve to the air motor. Allen, U.S. Pat. No. 3,710,873, Impact Wrench Or Screwdriver; Campbell, et al., U.S. Pat. No. 4,258,798 Air Passages For Pneumatic; States, U.S. Pat. No. 3,741,313, Power Operated Impact Wrench or Screwdriver; States, U.S. Pat. No. 3,578,091, Power Operated Impact Wrench or Screwdriver; Dalton, U.S. Pat. No. 2,899,935, Air Valve for a Pneumatic Tool; and Phisco et al., U.S. Pat. No. 4,024,892, Valve For Use In A Non-installation Tool disclose various types of toggle, trigger, or lever actuated valve mechanisms for initiation of operation of air tools. As previously mentioned certain air tools utilize a push to start mechanism along with a clutch as well as a mechanism to terminate the air flow to the motor of the pneumatic tool. Eckman, U.S. Pat. No. 4,631,992, Screw Driver discloses such a mechanism.

There has remained, however, the need for an improved air driven, rotary vane motor powered tool which includes an adjustable torque responsive clutch mechanism in combination with a valve mechanism that terminates air flow to the air motor upon reaching a predetermined torque level and further which is actuated by a lever actuated or toggle actuated control valve to initially provide fluid for the motor. Utilization of such a mechanism in a right angle screwdriver, for example, or similar pneumatic rotary air motor driven tool would be deemed especially useful. That is, such a tool would operate in response to manual actuation of a lever or trigger to drive a fastener or the like. Upon reaching a predetermined torque level, the clutch of the tool would disengage the air motor from the tool bit and simultaneously would effect closure of the air inlet valve to the air motor. Thereafter, the control lever of the tool, which is typically manually operable, would be released to permit resetting of the tool for the next cycle of operation.

SUMMARY OF THE INVENTION

In principal aspect the present invention comprises an improved pneumatic tool control mechanism. Specifically, a rotary air motor is actuated in response to manual opening of a normally closed valve in the air inlet line to the motor. The normally closed valve is opened only in response to actuation of a manual lever or trigger and is also closed only in response to manual operation of that lever or trigger. Air then flows through an inlet passage to the air motor. A normally open valve is provided in the inlet passage to the air motor between the lever actuated, normally closed valve and the motor. The normally open valve is mechanically linked to a torque sensitive, clutch mechanism of the air tool. Thus, the torque sensitive clutch is interposed between the outlet drive shaft of the air motor and the drive spindle or tool bit of the tool. When a predetermined torque is sensed, opposed clutch plates disengage thereby terminating the driving force to the tool bit and simultaneously, via the mechanical linkage in combination or with air inlet pressure effecting the closure of the normally open valve in the inlet passage to the air motor. The normally open valve will then remain in the closed condition until the manual lever or trigger actuation mechanism is released so as to close the valve associated therewith. Upon such closure, fluid pressure in the inlet passage, that otherwise retains the normally open valve in the closed condition, is vented to exhaust and the normally open valve once again is opened and the clutch is reset.

Thus it is the object of the invention to provide a novel air tool control mechanism for use in a pneumatic, torque responsive tool.

Another object of the invention is to provide an improved fluid operated tool which terminates fluid flow to the air motor upon detecting a predetermined torque or load on the tool.

A further object of the invention is to provide an improved pneumatic tool of the type that can be useful as a right angle tool and which is responsive to a manual actuator.

Still a further object of the invention is to provide an improved torque responsive fluid power tool having a simplified construction with a minimum of parts and which is easily repairable.

A further object of the present invention is to provide a torque responsive fluid power tool which automatically terminates operation of the motor of the power tool upon reaching a preselected, threshold value of torque.

These and other objects, advantages and features of the invention will be set forth in the detailed description which follows.

BRIEF DESCRIPTION OF THE DRAWING

In the detailed description which follows reference will be made to the drawing comprised of the following figures.

DESCRIPTION OF THE PREFERRED EMBODIMENT

General Construction

Figure 1:
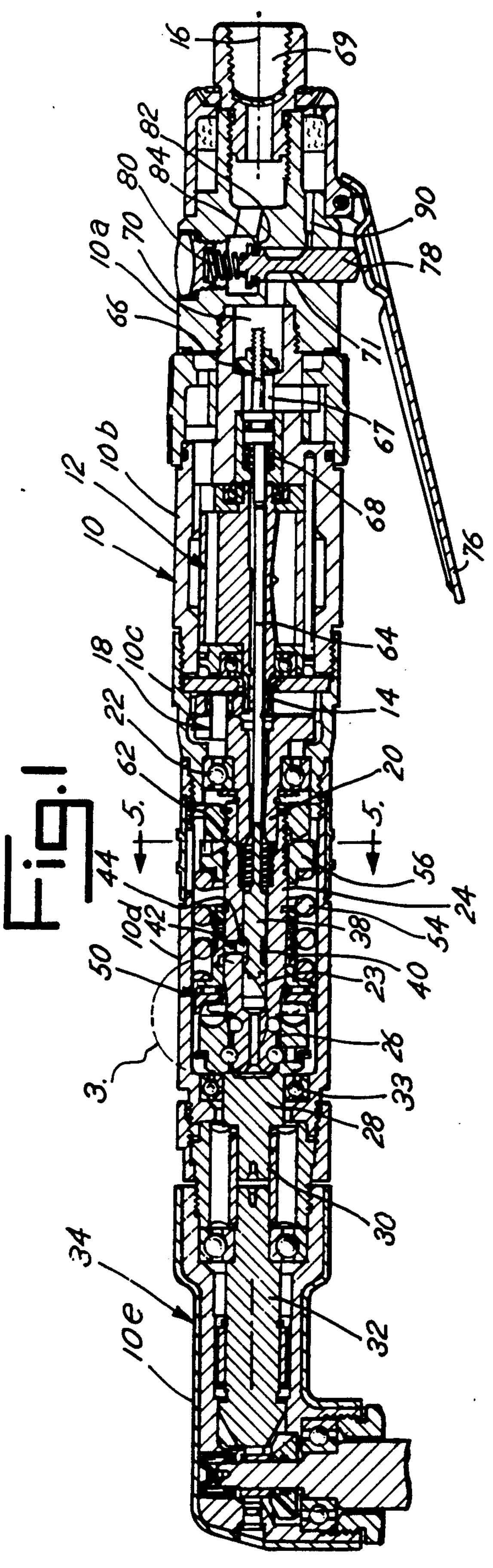
FIG. 1 is a side, cross sectional view of a right angle air power tool comprising a first embodiment of the invention which operates in response to manual actuation of a lever.
Figure 2:
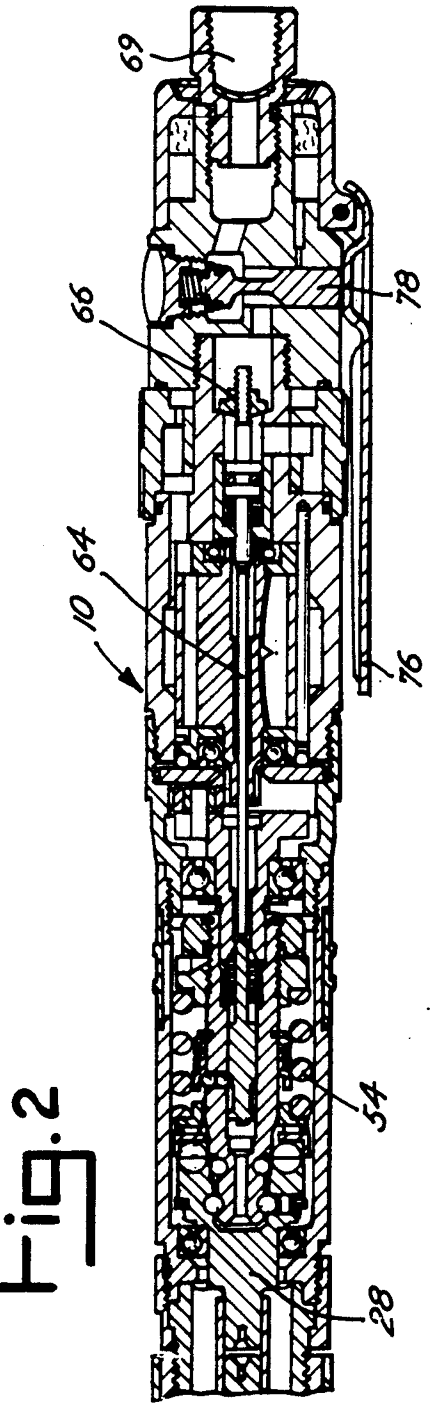
FIG. 2 is a side cross sectional view of the tool of FIG. 1 wherein the control lever has been depressed to the actuation position.

Referring to FIG. 1, there is depicted, in a cross sectional view, a lever actuated, right angle nut driver. The nut driver incorporates an adjustable torque responsive, clutch mechanism which not only disengages the drive spindle of the air motor from the tool bit upon reaching a threshold value of torque, but also actuates a linkage which effects closure of the flow of air to the air motor upon reaching such threshold torque. The air motor is initially operated or started in response to actuation of a hand operated lever which opens a normally closed valve in the air inlet passage to the air motor. FIG. 1 illustrates the tool in the nonoperating condition with the lever actuated starting valve in the closed position. FIG. 2 illustrates the same tool in the actuated condition wherein the lever has been depressed to open the air valve to permit air flow to the rotary vane air rotary motor. FIGS. 3–8 disclose in further detail the adjustable clutch mechanism for the lever actuated tool. FIG. 9 discloses a second embodiment of the invention; namely, a trigger actuated tool.

Referring first, therefore to the embodiment of FIGS. 1–8, and particularly FIGS. 1 and 2, the tool is generally described as follows: A housing 10 incorporates a rotary vane air motor 12 which is mounted upon appropriate bearings in the manner known to those skilled in the art within the housing 10. Note, the housing 10 is comprised of a variable number of cylindrical sections each of which house a distinct component of the tool. Thus, the tool of FIG. 1 includes a first section 10*a* for the lever control valve, a second section 10*b* for the air motor, a third gear reduction or transmission section 10*c*, a clutch section 10*d*, and a tool bit section 10*e*. The choice of specific sections and the tool components in each section may be varied. Also the entire tool mechanism can be enclosed in a single housing 10.

The rotary vane air motor 12 includes an output shaft 14 which lies on a center line axis 16 of the tool. Of course, the tool depicted in FIGS. 1 and 2 is generally symmetrical about the longitudinal axis 16.

The motor output shaft 14 is connected to a gear reduction or transmission assembly 18 having a principal output drive shaft 20 mounted in bearings 22 within the housing 10. The shaft 20 is coupled or keyed to a bearing mounted drive shaft 24 which also lies on the center-line axis 16.

Shaft 24 comprises a driving connection from the transmission assembly 18 of the tool to the clutch mechanism. Shaft 24 is rotatably inserted within a counter bore 26 defined in a clutch member 28. Shaft 24 is rotatable with respect to clutch member 28, but it is not axially translatable. The clutch member 28 is likewise mounted on bearings 33 in the housing 10 so it is rotatable about the axis 16 but is not axially translatable. The clutch member 28 is a driving member associated with the clutch mechanism of the invention. The clutch member 28 includes a central output spindle 30 which is, keyed or connected to a drive shaft or rod 32 associated with a right angle tool bit assembly 34. Thus the spindle 30 provides a direct drive to the right angle tool bit assembly 34.

A center line passage 23 extends through the connecting shaft 24 and the axial shaft of the motor 12 to the rear end of the housing 10. Positioned within the passage 23 defined in shaft 24 is a slidable cam member 38, which includes a cam surface 40 that cooperates with ball bearings 42 that extend through a transverse or radial opening 44 in the connecting shaft 24. The bearings 42 are retained in the radial passage 44 by a collar 46 which is slidably biased over the passage 44 by a spring 48. The spring 48 biases the collar 46 against a driven clutch plate assembly 50 which with shaft 24 cooperates with clutch member 28 through interaction of connecting ball bearings 52.

The driven clutch plate assembly 50 is keyed to shaft 24 by virtue of the shaft 24 having a hexagonal shape which fits into a hexagonal opening in the assembly 50 so that the plate 50 can slide axially on shaft 24 and will rotate with shaft 24. A clutch biasing spring 54 impinges against the collar 50*a* of assembly 50. Spring 54 provides an adjustable biasing force against assembly 50 in response to an adjustable nut 56 threaded on the outside of shaft 24. Thus the spring 54 biases the driven clutch plate assembly 50 into engagement with clutch plate or member 28 through the interaction of the ball bearings 52.

Figure 3:
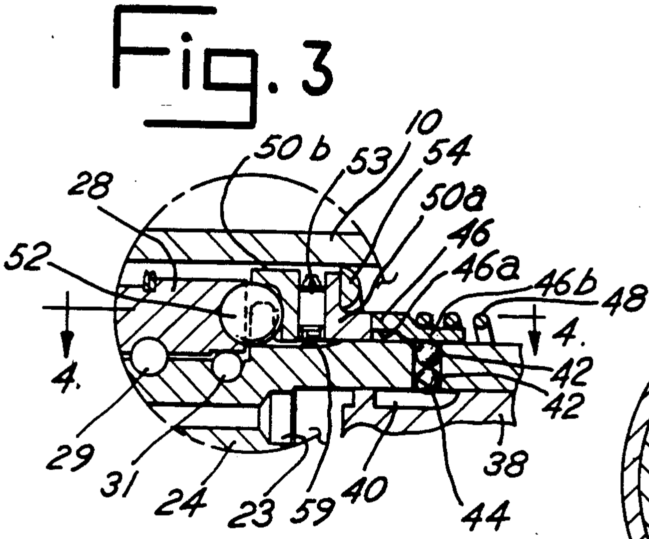
FIG. 3 is an enlarged cross sectional view of a portion of the clutch mechanism depicted in FIG. 1.
Figure 4:
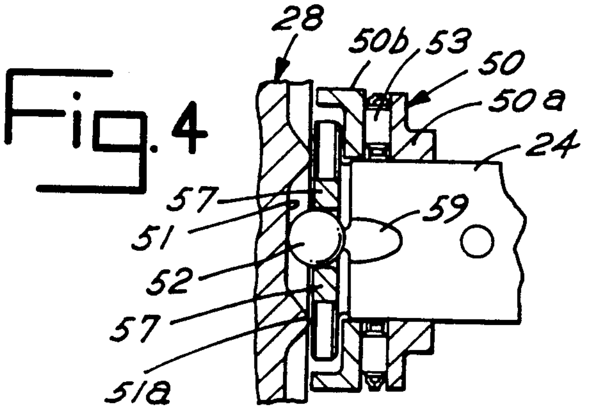
FIG. 4 is a cross sectional view taken substantially along the lines 4—4 in FIG. 3.

As depicted in FIGS. 3 and 4 in detail, assembly 50 includes a second annular flange collar 50b which is spaced from collar 50a by roller bearings 53. The shaft 24 includes spaced radial teeth 57 which receive a single ball bearing 52 between each pair of teeth 57. A land 59 is defined on the outside surface of shaft 24 between teeth 57 for guiding each bearing 52. In the embodiment shown, there are four equally spaced lands 59, bearings 52 and paris of spaced teeth 57 as well as four pockets 51.

The bearings 52 are retained by collar 50b and teeth 57 and biased by spring 54 toward pockets 51. The edges of pockets 51 are all similarly contoured from a low center as shown in FIG. 4 to a high edge 51a. The height of the edge 51a is such that upon reaching the appropriate torque level, the collar 46 will be displaced axially so as to reveal the increased diameter portion 46a thereof for receipt of balls 42. Normally, the reduced diameter portion 46b thereof as shown in FIG. 3, precludes radial movement of the balls 42.

The cam member 38 which is retained within the center line passage 23 through the shaft 24 is axially slidable and is generally biased from sliding to the right in FIG. 1 by a coaxial spring 62. Travel of member 38 to the left in FIG. 1 is limited by engagement with the balls 42.

The sliding cam member 38 cooperates with a coaxial connecting rod 64 which is slidably mounted in the center line axis passage 23 through the center shaft of motor 12. Rod 64 cooperates with a spring biased normally open valve member 66. Specifically, normally open valve member 66 is situated in the inlet passage 67 to the air motor 12. The valve 66 is normally biased by means of a spring 68 to the open position so that the inlet air may flow from an inlet 69 into chamber 70 then pass valve 66 into the inlet passage 67 to the air motor 12. The valve 66 is maintained in a normally open position by the fact that the centerline connecting rod 64 attached to the valve 66 is precluded from movement to the left in FIG. 1 by virtue of the bearings 42 which act on the surface 40 of cam member 38. Thus the normally opened valve 66 is mechanically maintained in the open position.

A manual lever 76 cooperatively engages a spring biased valve member 78 valve member 78 is biased by spring 80 toward the closed position. A valve seat 82 is provided in the inlet passage 86 for cooperation with the O-ring 84 of valve member 78 encloses air inlet passage 86 to preclude the flow to the air motor via the chamber 65 and the passage 67. In order to open the valve 78, the lever 76 is depressed overcoming the force of spring 80 and moving the valve member 78 so as to lift it from the seat 82. This permits airflow through the air inlet 86 to the air motor 12.

The valve member 78 has a special shape and design which when it is in the closed position, as shown in FIG. 1, permits exhaust from the chamber 70 through a reduced diameter section 71 defined about the valve member 78. Thus a reduced diameter section 71 permits exhaust flow from the chamber 70 into an exhaust passage 90 and then to the atmosphere.

FIGS. 3 through 8 illustrate in greater detail construction of the specific torque responsive clutch mechanism. Referring to those FIGURES, it will be noted that the shaft 24 is rotatable with respect to the driving member 28. However, the two parts are not axially displaceable with respect to each other. The driven member assembly 50 is, as previously described, keyed to shaft 24, is axially displaceable on shaft 24 and is also biased into engagement with driving member 28. That is bearings 29 and 31 ensure that the members 24 and 28 remain axially connected. A separate roller or bearing 52 fits within each pocket 51 defined in face of the clutch member 28 opposing the plate 50. The spring 54 biases the 50 against the balls 52 forcing the balls into the pockets 51. The force of the spring 54 determines the torque setting which causes the bearings or balls 52 to move from the pockets 51 and terminate the driving force to the right angle tool bit.

Figure 5:
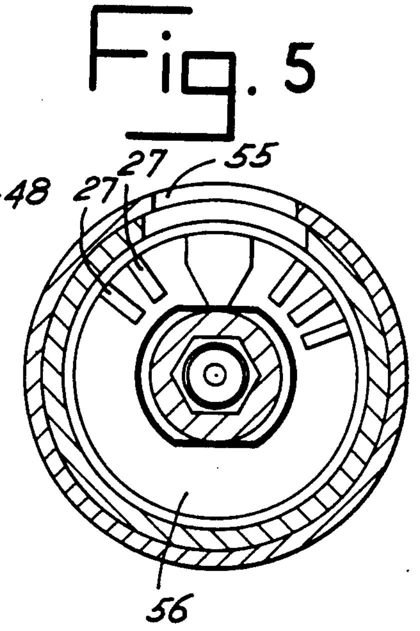
FIG. 5 is a transverse cross sectional view taken substantially along the line 5—5 in FIG. 1.

The compression force of the spring 54 is adjustable in the manner depicted in FIG. 5 where it is disclosed that a passage 55 for a key member (not shown) is provided in the housing 10 so that slots or teeth 27 in the adjustment screw or nut 56 may be engaged to turn the nut 56 thereby adjusting the compression by tightening or releasing the compression of the spring 54. Thereby the torque setting is adjusted.

Figure 6:
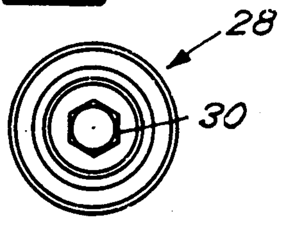
FIG. 6 is an end view of the driving member associated with the clutch in FIG. 1.
Figure 7:
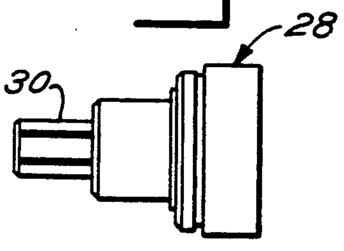
FIG. 7 is a side view of the driving member in FIG. 6.
Figure 8:
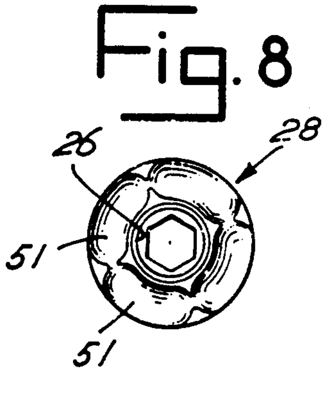
FIG. 8 is the opposite end view of the member in FIG. 7.
Figure 9:
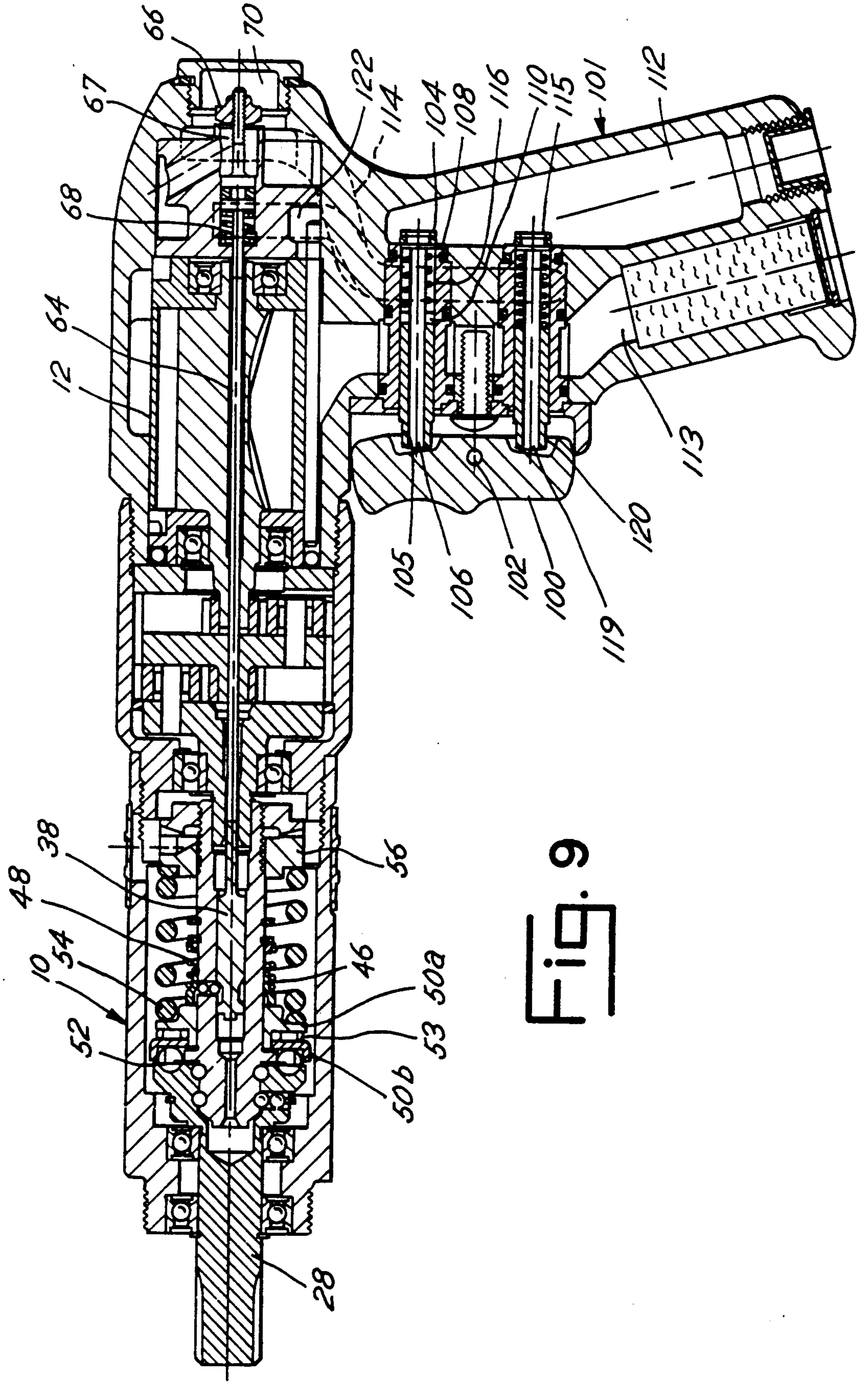
FIG. 9 is a side cross sectional view of an air operated tool wherein the input air to the tool is controlled by a toggle mechanism rather than a lever mechanism and thus constitutes a second embodiment of the invention.

FIGS. 6 through 8 illustrate the specific construction of the clutch spindle or member 28. FIG. 4 illustrates another view wherein the construction of the shaft 24 is shown relative to the driven member assembly 50 and driving clutch member 28 and, more particularly, where the balls 51 are shown as they operate to provide for engagement.

Operation of the First Embodiment

Referring to FIG. 1, the valve member 78 is maintained in a position wherein exhaust from chamber 70 through the passage 90 permits the spring 68 to move the valve 66 to the normally opened position. When in this normally opened position, the rod 64, and thus the cam member 38, are moved to the right and maintained to the right by the interaction of the balls 42 which are held in place by the collar 46. The clutch mechanism is in the driving position inasmuch as the balls 52 are fully in the pockets 51. Upon depression of the lever 76, fluid flows past the seat 82 into the chamber 70, inlet 67 and then to the motor 12 thereby driving the motor 12 and its output shaft 14. This, in turn, drives the shaft 24 rotationally about the axis 16. The clutch assembly 50 and member 28 engage by virtue of their relationship with the balls 52. Thus, as shaft 24 rotates the clutch member 28 rotates thereby providing an output through the right angle attachment 34.

Upon reaching of a predetermined torque, the balls 52 rise out of the pockets 51 moving the driven member assembly 50 against the force of the springs 54. This causes the collar 46 to move to the right in FIG. 1 thereby releasing the balls 42 in radial passage 44. The balls 42 are cammed outward in the passage 44 due to the fact that the pressure of fluid flow on the valve 66, which is normally open, is sufficient to cause the valve 66 to move to the left or closed position thereby driving rod 64 and the cam member 38 to the left as it has been released. Thus, cam member 38 is released by virtue of removal of the retaining force associated with the ball bearings 42.

In sum, two actions have occurred upon sensing of the torque limit. First, the driving force of the motor 12 is terminated due to the disconnection of the driven plate assembly 50 and driving plate 28. Second, the normally open valve 66 is closed and the tool motor 12 stops. The tool may then be removed from the work piece. The lever 76 is then released.

Upon release of the lever 76, fluid flow to the chamber 70 is terminated since the valve O-ring 84 is seated on the seat 82. This permits exhaust fluid to flow from the chamber 70 past the narrow waisted portion 71 of the valve 78 and thence through the exhaust outlet 90. When the pressure in the chamber 70 is sufficiently low, the spring biasing force associated with the spring 68 will open the normally open valve 66 and release rod 64. Thus, being released, the rod 64 may slide to the right. The clutch member 50 then moves to its initial position as depicted in FIG. 1 thereby causing the collar 46 to drive the balls 42 into the passage 44 and resetting the cam member 38 again to the position shown in FIG. 1.

Alternative Embodiment

FIG. 9 illustrates an alternative embodiment of the invention wherein various elements and parts including the clutch mechanism depicted are substantially identical to that in FIG. 1 so that like parts have like numbers. The tool is a pistol grip type tool which includes a toggle control rather than a lever control. Thus, it can be seen that the clutch mechanism as well as a normally opened valve 66 and the motor 12 are the same. The toggle provides fluid flow control to the chamber 70.

Specifically, a toggle 100 is mounted for pivotal movement on a pin 102 in a pistol grip 101. The toggle 100 operates a air control inlet valve 104 to permit flow of air from an air inlet 112 past an O-ring valve seat 108 into an inlet passage 114 connected to chamber 70 on the upstream side of the normally opened valve 66. The toggle 100 also cooperates with a second valve 115 which provides for reverse operation of the motor. The reverse operation bypasses the normally open valve 66 in any event.

The toggle 100 thus operates in substantially the same manner as the lever control of FIG. 1. That is actuation of the toggle 100 by clockwise movement in FIG. 9 drives valve stem 106 and a sleeve 105 to the right in FIG. 9. Sleeve 105 is normally biased by a spiral spring 116 toward the left position in FIG. 9. Toggle actuation raises the valve 104 from seat 108. Simultaneously the moving sleeve 105 closes an exhaust port 110 inlet passage 114 and from an exhaust passage or outlet passage 113 in the grip 101. Inlet air may then flow through an inlet 112 into passage 114, chamber 70 around valve 66 and to the motor 12. Inlet air flows thus past the normally opened valve 66, thereby causing the air motor 12 to operate until the clutch mechanism senses the threshold torque. Upon sensing of the threshold torque, the clutch disengages and also causes the normally opened valve 66 to close.

Upon release of the toggle 100, the chamber 70 is connected to the atmosphere via inlet passage 114, exhaust passage 110 and outlet passage 113. When operated in reverse, air flow moves past the valve 115 which is opened by engagement of toggle 100 with stem 119 and sleeve 120. Air then flows into the passage 122 to effect reverse operation of the motor.

While there has been set forth a preferred embodiment on the invention it is to be understood that the invention is to be limited only by the following claims and their equivalents.

What is claimed:

1. An improved fluid tool comprising, in combination;

a tool housing;

a fluid driven motor with a rotary output shaft in the housing;

a fluid inlet to the motor;

a fluid outlet from the motor;

an inlet control valve mechanism to control admission of fluid to the motor;

a clutch mechanism connecting the motor output shaft with a tool bit, said clutch mechanism including a driven member driven by the motor output shaft;

a driving member rotatably coupled to the driven member, and means for axially decoupling the driven member from the driving of the driving member whenever a predetermined torque setting results by action of the bit on a work piece;

a normally opened valve in the fluid inlet for passage of fluid to the motor including first biasing means for biasing the normally opened valve toward the open position and also including an inlet chamber;

means for effecting closure of the normally opened valve, said means comprising the combination of a mechanical linkage between the clutch mechanism and the normally opened valve, and pressurized inlet fluid in the inlet chamber of the normally opened valve; said linkage and fluid together acting to close the normally opened valve whenever the predetermined torque setting results and the driven member is decoupled from the driving member; and said inlet control valve mechanism including a manually operated, normally closed inlet valve in the fluid inlet which is manually operable to open the passage for flow of fluid to the motor by flow through the normally opened valve, said normally closed inlet valve including an exhaust passage from the normally opened valve inlet chamber for fluid flow to exhaust whenever the manual valve is in the closed positioned to thereby permit resetting of the linkage and reopening of the normally opened valve after closure by the first biasing means.

2. The tool of claim 1 wherein the mechanical linkage of the means for effecting closure further comprises an axially slidable rod connected between the normally opened valve and clutch mechanism, said clutch mechanism including an actuator for mechanically engaging and retaining the rod in the valve opened position and further including an actuator release mechanism operable in response to decoupling of the clutch members to thereby release the retaining rod from the actuator so as to permit the normally opened valve to move to the valve closed position from the open position in response to the pressurized air from the fluid inlet acting on the normally opened valve.

3. The tool of claim 1 wherein the normally closed inlet valve is a lever actuated slide valve.

4. The tool of claim 1 wherein the normally closed inlet valve is a trigger actuated toggle slide valve.

5. The tool of claim 1 wherein the exhaust passage is a restricted passage normally opened when the inlet valve is in the closed position.

6. The tool of claim 1 wherein the tool bit is a right angle tool member driven through a mechanical linkage by the driving member.

7. The tool of claim 1 wherein:

the clutch mechanism comprises a first plate associated with the driving member, said first plate mounted in the housing for rotary drive and not being translatable in the axial direction;

the driven member comprises a second plate in opposed relation to the first plate and axially biased toward the first plate, said clutch mechanism further including coupling elements cooperatively engaging the second plate in driving relation with the first plate; and said second plate being axially displaceable out of driving engagement with the first plate on attainment of the predetermined torque setting thereby terminating driving force to the driving member and tool bit.

8. The tool of claim 7 including an actuator cooperative with the second plate, said actuator being axially moveable with respect to the second plate whenever the plates disengage to thereby release the normally opened valve by actuation of the linkage to effect closing of the normally opened valve.

* * * * *